United States Patent [19]

Oda et al.

[11] Patent Number: 4,905,417

[45] Date of Patent: Mar. 6, 1990

[54] NUMERICAL CONTROL GRINDING MACHINE

[75] Inventors: Yukio Oda; Yoshio Wakazono, both of Kariya, Japan

[73] Assignee: Toyoda Koki Kabushiki Kaisha, Kariya, Japan

[21] Appl. No.: 244,105

[22] Filed: Sep. 14, 1988

[30] Foreign Application Priority Data

Sep. 14, 1987 [JP] Japan ................................ 62-231558

[51] Int. Cl.$^4$ ............................................. B24B 49/00
[52] U.S. Cl. .............................. 51/165 TP; 51/165.8; 51/165.83
[58] Field of Search ............. 51/165.8, 165.83, 165.91, 51/165.77, 165 TP, 283 R, 283 S

[56] References Cited

U.S. PATENT DOCUMENTS 4,117,634 10/1978 Sugita et al. ...................... 51/165.91
4,711,054 12/1987 Tsujiuchi et al. .

FOREIGN PATENT DOCUMENTS 0224735 6/1987 European Pat. Off. .

*Primary Examiner*—Frederick R. Schmidt
*Assistant Examiner*—M. Rachuba

*Attorney, Agent, or Firm*—Oblon, Spivak, McClelland, Maier & Neustadt

[57] ABSTRACT

In a numerical control grinding machine using a grinding wheel made of cubic boron nitride, a computerized numerical controller controls the infeed movement of a wheel head to effect a rough grinding, a drifty grinding and a fine grinding on a rotating cylindrical workpiece. The drifty grinding due to a spring-back motion which is caused by a flexed workpiece is initiated in response to a sizing signal from a sizing device which measures the workpiece diameter varying momentarily during the grinding operation and is terminated upon the expiration of a predetermined time which is sufficient to vanish the variation of the workpiece diameter. A sizing device measures the actual diameter thereafter, and the sizing signal is compensated in order to approximate the actual diameter to a desired set size which is the sum of a finish diameter and a predetermined allowance for the subsequent fine grinding operation, as the number of the workpieces increases. That is, the numerical controller diminishes a set size which determines the time point to issue the sizing signal from the sizing device, toward the desired set size on a step-by-step basis with the increase in number of the workpieces ground.

3 Claims, 5 Drawing Sheets

NUMERICAL CONTROL GRINDING MACHINE

BACKGROUND OF THE INVENTION

1. Field of the Invention

The present invention relates to a grinding machine wherein in response to a signal issued from a sizing device when a workpiece being ground reaches a predetermined size, the infeed movement of a grinding wheel carrier is halted prior to a fine grinding operation for removing the flexing of the workpiece.

2. Discussion of the Prior Art

Up to now, there is known a numerical control grinding machine wherein the grinding mode is changed in response to a first sizing signal issued when a workpiece is ground to a predetermined size. However, the workpiece is ground by a grinding wheel at a predetermined infeed rate so that the workpiece is flexed toward the feed direction of the grinding wheel. Where the infeed movement of the grinding wheel is halted upon detecting the first sizing signal, a problem arises in that the workpiece is continued to be further ground an amount due to its spring-back motion which is caused by the flexed workpiece. Hereafter, the grinding caused by the spring-back motion will be referred to as "drifty grinding", and similarly, the grinding amount in such "drifty grinding" will be referred to as "drifty grinding amount". Therefore, it is necessary to add the drifty grinding amount to a set size which determines the time point to issue a second sizing signal for the initiation of a fine grinding operation.

By the way, in the case of CBN (Cubic Boron Nitride), because the grinding capability is small right after each truing operation as well as at the first use of new grinding wheel, the drifty grinding amount increases. Further, as the number of the ground workpieces increases, the drifty grinding amount decreases by reason that the cutting edge of each abrasive grain is broken so that the grinding capability becomes large. Therefore, if the set size of the workpiece diameter upon issuance of the first sizing signal is constant without regard to the number of ground workpieces, the grinding accuracy may be degraded with increase in the number of workpieces, and in addition, the grinding cycle time and the feed amount of a rest jaw may be varied.

In order to solve such problems, in the prior art, the set size of the workpiece diameter upon which the first sizing signal is issued is diminished with increase in number of ground workpieces based on the experimental relation between the number of ground workpieces and the cutting quality of the CBN grinding wheel. As a consequence, the drifty grinding amount is controlled to be nearly constant throughout all the grindings of workpieces.

However, the relation between the number of ground workpieces and the cutting quality varies with the kind of CBN grinding wheel used, the material of workpieces, the grinding amount par workpiece and so forth. For this reason, in the prior art method wherein the set size which determines the time point to issue the first sizing signal is altered a predetermined value each time a workpiece is ground, there is raised another problem that the relation between the set size above and the number of ground workpieces has to be altered to meet respective conditions such as the kind of grinding wheels, the material of workpieces, the grinding amount par workpiece and so forth.

SUMMARY OF THE INVENTION

It is therefore a primary object of the present invention to improve the grinding accuracy of the workpiece without relation to the kind of grinding wheels, the material of workpieces and the grinding amount par workpiece by automatically altering to a proper value a set size which determines the time point to issue a first sizing signal.

Another object of the present invention is to provide a high efficiency numerical control grinding machine wherein an allowance for a fine grinding can be maintained constant notwithstanding that the cutting quality of a grinding wheel used varies largely with the increase in number of the workpieces ground after each truing operation.

Briefly, in a numerical control grinding machine according to the present invention, a sizing signal is issued from a sizing device when the actual diameter of a workpiece observed thereby coincides with a set size stored in a data storage device, and the infeed movement of the grinding wheel is halted upon issuance of the sizing signal. Thereafter, the actual diameter is measured by the sizing device in response to a diameter read command generated upon the satisfaction of a predetermined condition, such as, for example, a sufficient time which requires to make the aforementioned drifty grinding completed or state in which the variation velocity of workpiece diameter reaches a tolerable range. A calculation is then performed for the difference value between the measured diameter above and a reference size which is determined taking into account an allowance left after the drifty grinding. The set size which determines the time point to issue the sizing signal is compensated for the difference value. Thus, as the number of ground workpieces increases, the size of the workpiece diameter upon completion of the drifty grinding after the halt of the infeed movement approach the reference size. Consequently, the accuracy of the ground workpieces can be improved and the allowance for a subsequent fine grinding operation becomes constant, because the sizing signal is issued when an observed diameter coincides with the diameter having been compensated for the difference value which has been calculated in the grinding of the preceding workpiece.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which.

DETAILED DESCRIPTION OF PREFERRED EMBODIMENTS

Figure 1:
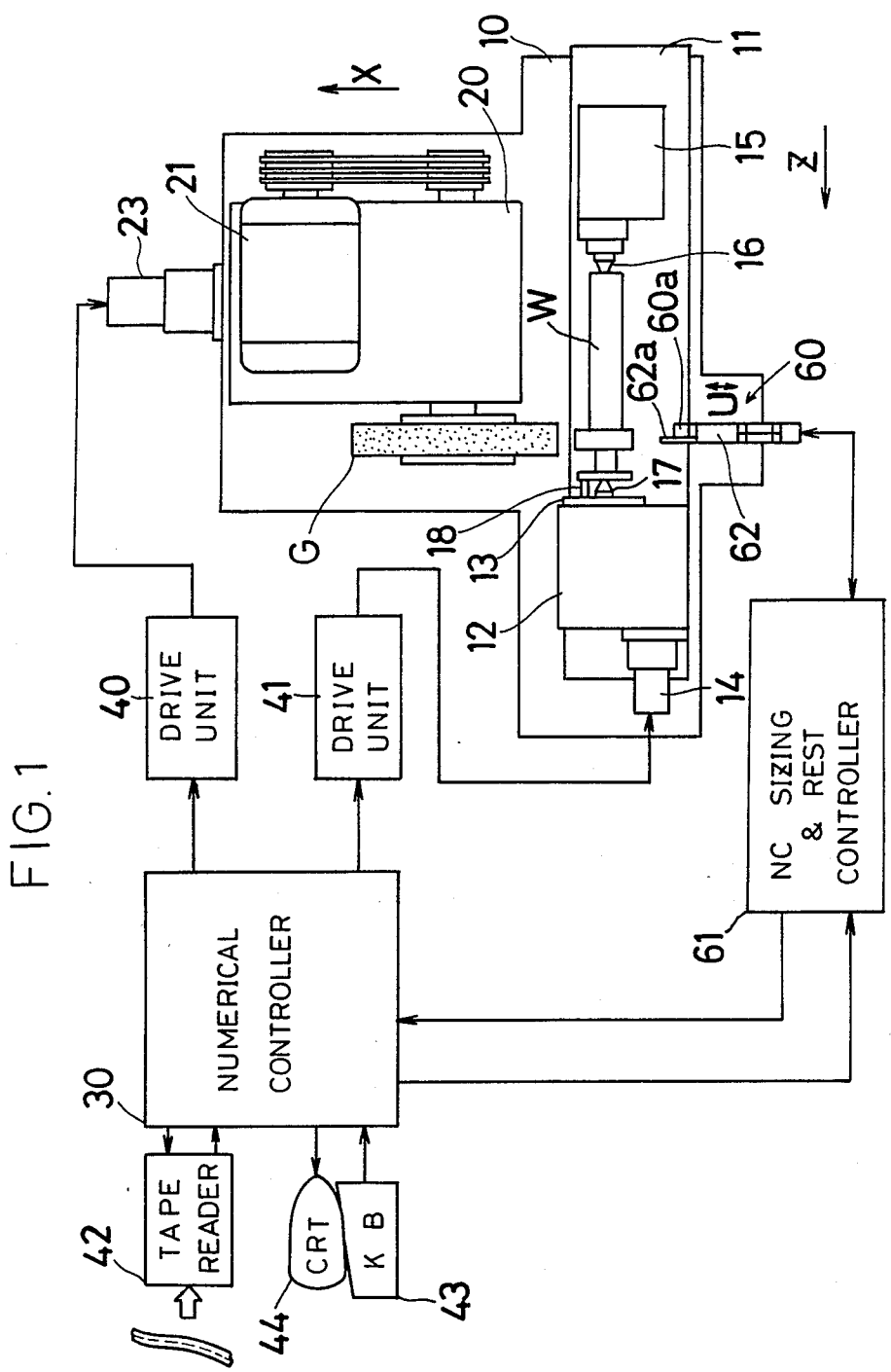
FIG. 1 is a schematic view showing the structure of a numerical control grinding machine according to the present invention.

Preferred embodiments of the present invention will be described with reference to the accompanying drawings.

A work head 12 rotatably carrying a work spindle 13, which is driven by a servo motor 14, is guided slidably on a table 11. A tail stock 15 is fastened on the right end of the table 11 and a workpiece W is carried between centers 16 and 17 of the tail stock 15 and a work spindle 13. The workpiece W is formed at its one end with a pin hole, into which a locating pin 18 protruding from the work spindle 13 is snugly inserted, so that the angular phase of the workpiece W coincides with that of the work sprindle 13.

At the rear top of the bed 10, the wheel head 20 is drivingly connected with a servomotor 23 through a feed screw (not shown) and is advanced or retracted in a direction perpendicular to the workpiece axis by rotating the servomotor 23 forward or backward.

On the other hand, a steady rest 60 with a jaw 60a which supports the workpiece W against the grinding wheel G is provided at the front of the bed 10 to be moved in the direction of U axis by a hydraulic actuator (not numbered). The steady rest 60 is disposed at the position which faces the grinding wheel G, as disclosed in U.S. Pat. No. 4,711,054 to the same assignee of this application. A pair of measuring probes 62a adjustable with the distance therebetween protrude from a sizing head 62, which is carried on the steady rest 60. The distance between the probes 62a is adjusted to a finish size of the workpiece diameter by a numerical controller 30 through an NC sizing and rest controller 61, and moreover, the probe distance so adjusted is determined to indicate a zero value point. While the diameter of the workpiece W is observed, the probe distance varies momentarily with the variation of the workpiece diameter, because the probes 62a are spring-biased to close, as well known in the art. More specifically, the sizing head 62 is provided with a differential transformer (not shown) which converts the relative displacement between the probes 62a into a corresponding electric signal, which is input to the NC sizing and rest controller 61 so as to be converted from analog form into digital form by means of an A-D converter (not shown) therein. The digital signal is output form the NC sizing and rest controller 61 to the numerical controller 30. Further, the NC sizing and rest controller 61 is operable to receive a set size from the numerical controller 30 and to issue a first sizing signal to the numerical controller 30 when the actual diameter observed by the probes 62a coincides with the set size, as described later in detail.

Drive units 40, 41 are for respectively driving servomotors 23, 14 in response to command pulses from the numerical controller 30. The numerical controller 30 mainly controls the servomotors 14, 23 to synchronize the same with each other and further controls feed movement of the steady rest jaw 60a in order to grind the workpiece W. There are connected with the numerical controller 30, a tape reader 42 and a keyboard 43 for inputting machining cycle programs, control parameters and various other data, and a CRT display device 44 for displaying various information.

Figure 2:
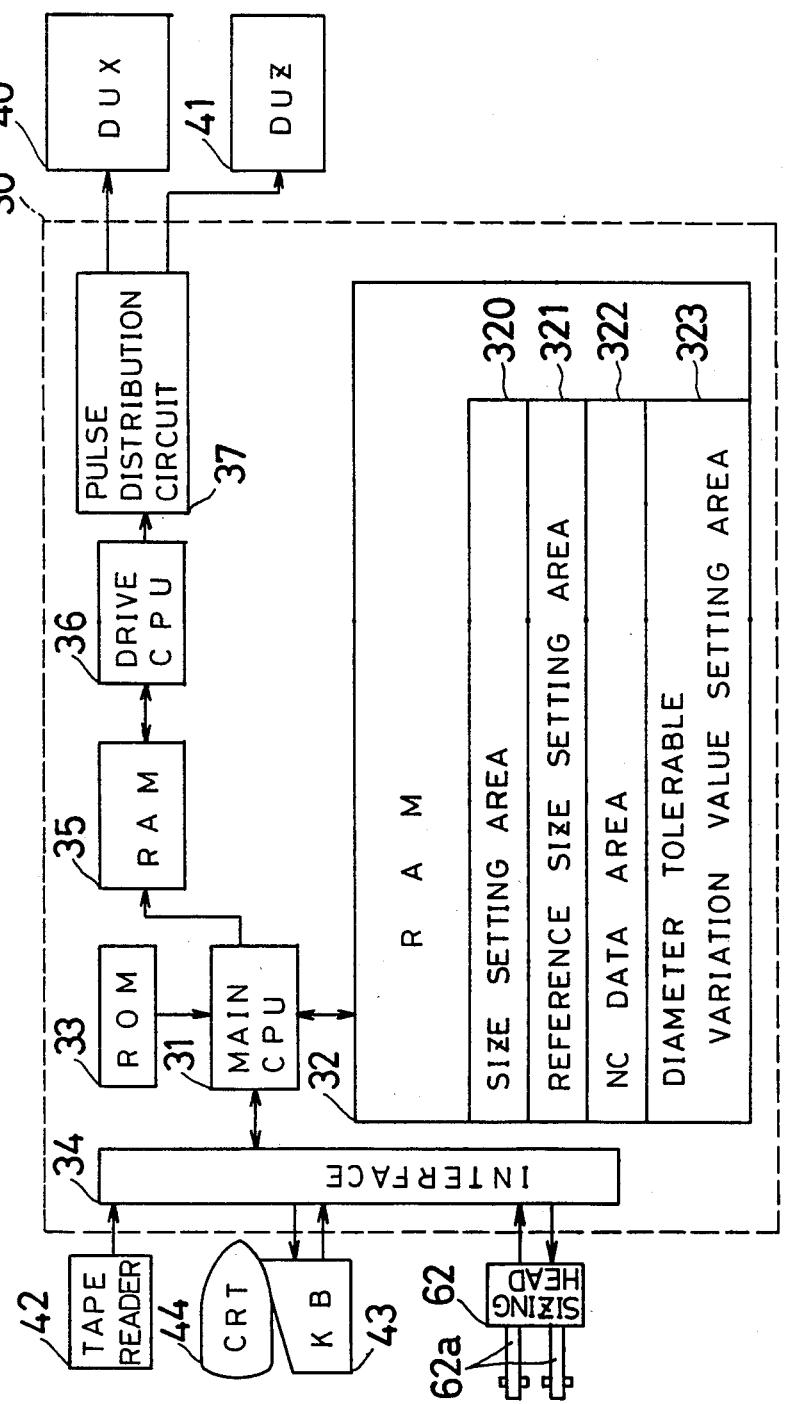
FIG. 2 is a block diagram showing electrical components of a numerical controller.

As shown in FIG. 2, the numerical controller 30 is mainly composed of a main CPU (central processing unit) 31 for controlling the grinding machine, a ROM (read-only memory) unit 32 having stored programs to control the grinding machine, a RAM (random access memory) unit 32 having stored input data such as a tolerable value regarding the variation of the workpiece diameter, and an input/output interface circuit 34. More specifically, in the RAM unit 32, there are formed a size setting area 320 for storing a set size of the workpiece diameter at which the first sizing signal is to be issued in order to halt infeed movement of the grinding wheel G, a reference size setting area 321 for storing a reference size indicative of a theoretical diameter which the workpiece W would have upon completion of a drifty grinding, and an NC data area 322 for storing NC data. The numerical controller 30 further includes a drive CPU 36, another RAM unit 35 and a pulse distribution circuit 37 which constitute a system to drive the servomotors 14, 23. The RAM unit 35 is for storing positioning data of the grinding wheel G input from the main CPU 31. The drive CPU 36 performs the slow-up/slow-down control on feed movements of the grinding wheel G, the calculation for interpolation points up to each objective point and the processings for outputting positioning data of the interpolated point at a predetermined time interval. The pulse distribution circuit 37 outputs feed command pulses.

The machining operation performed by the apparatus as constructed above will be described hereafter.

Figure 3:
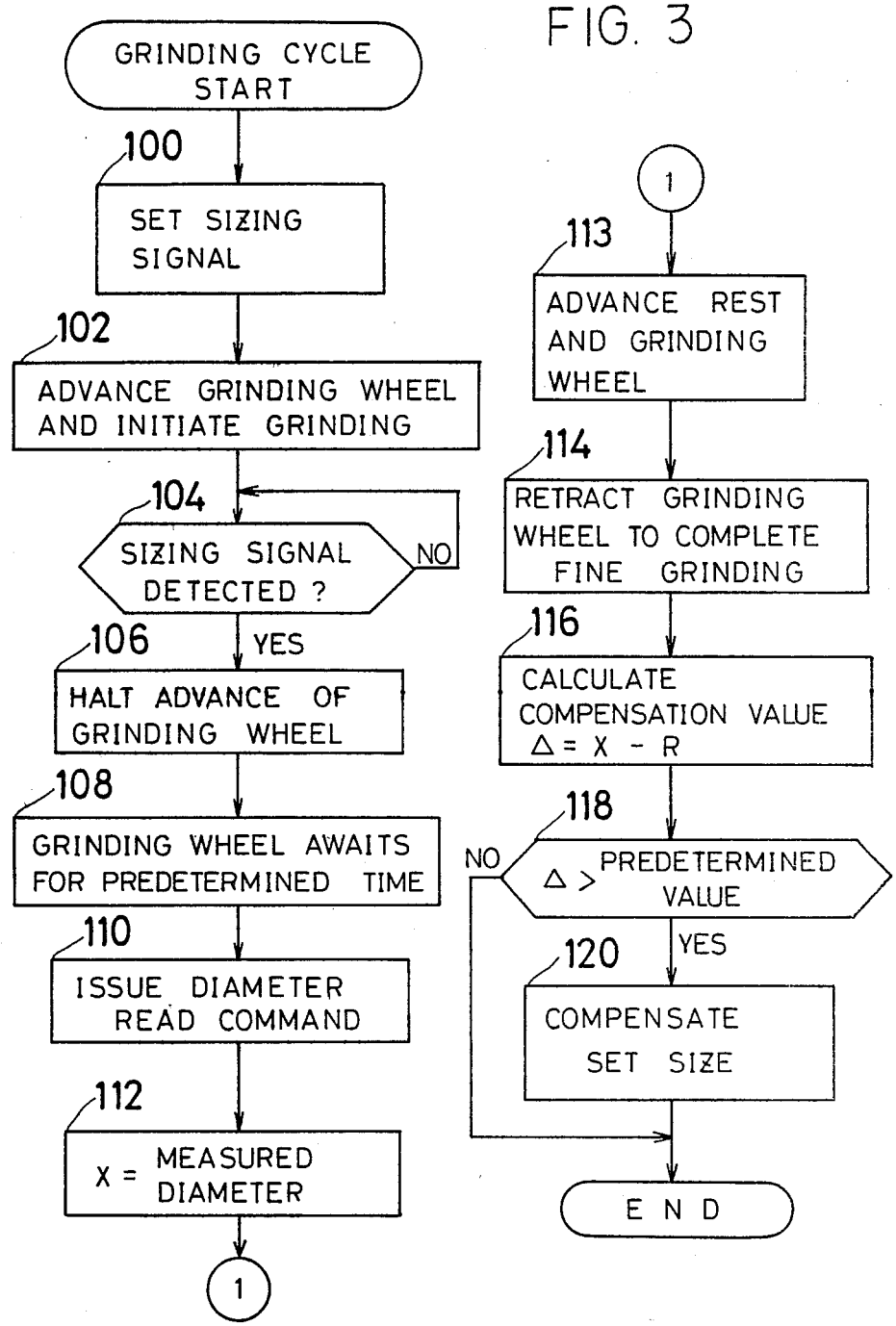
FIG. 3 is a flow chart of a subroutine executed by a central processing unit in a first embodiment of the present invention.

First of all, an initial size A1 of the workpiece diameter upon which the first sizing signal is to be issued is set in the size setting area 320 of the RAM unit 32. Thereafter, a grinding cycle program shown in FIG. 3 is started when a grinding start command is given. At step 100, the foregoing set size A1 stored in the size setting area 320 is output to the NC sizing and rest controller 61, so that a time point at which the first sizing signal is to be issued is set therein. At next step 102, the grinding wheel G is advanced to initiate the rough grinding of the workpiece W. Thereafter, at step 104, the main CPU 31 executes a processing for ascertaining whether or not, the first sizing signal has been output from the NC sizing and rest controller 61. Step 106 follows upon detecting the sizing signal thereat and the advancement of the wheel head 20 halts.

Figure 4:
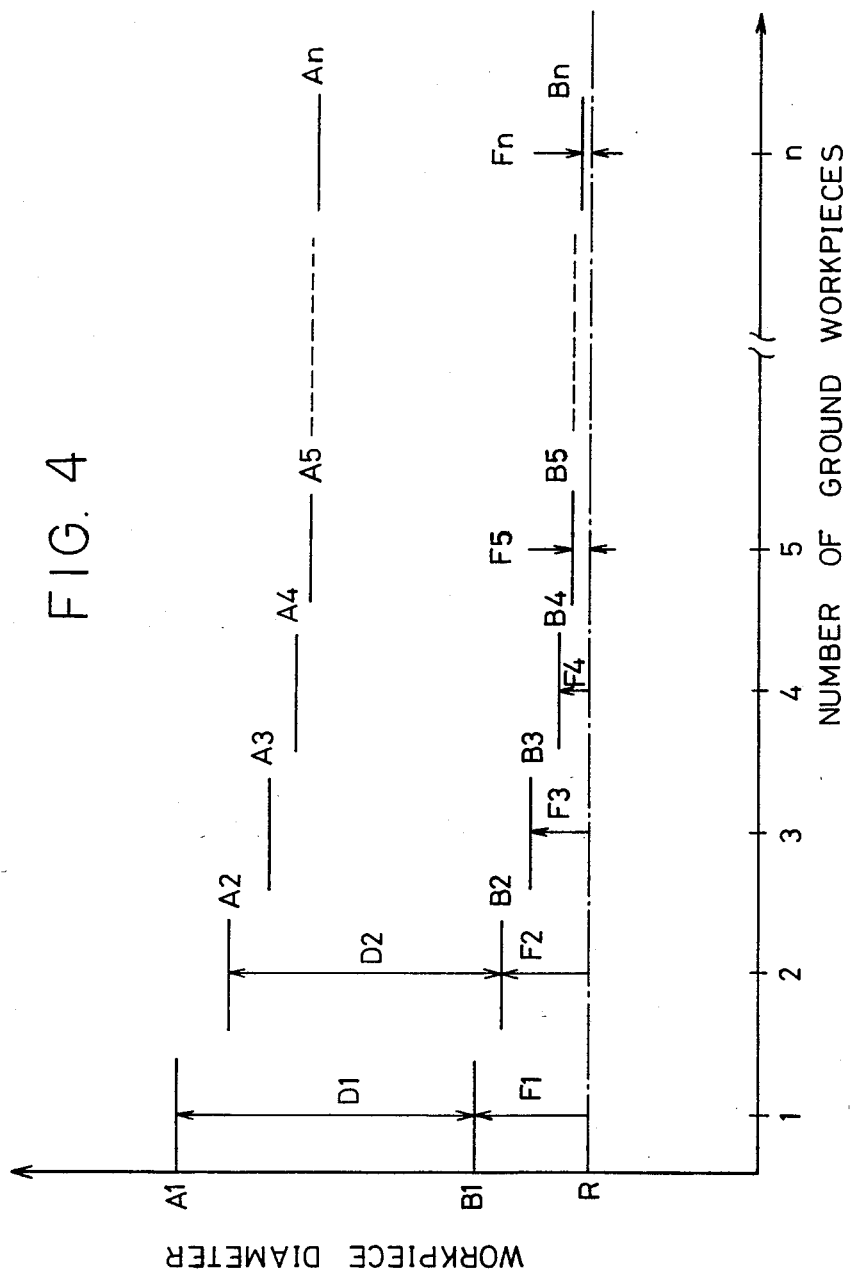
FIG. 4 is a graph explaining the state that a set workpiece diameter which determines the time point to issue a first sizing signal from a sizing device is varied toward a desired value.

Subsequently, at next step 108, the wheel head 20 with the grinding wheel G rotating remains being halted for a predetermined time. As a result, the drifty grinding due to a spring-back motion caused by the flexed workpiece W is performed to remove an amount D1 from the workpiece W during this waiting time. The predetermined time for this waiting is sufficient to make the variation of the workpiece diameter to vanish, namely to return the workpiece axis to an ideal position. That is, the first sizing signal is issued when the actual workpiece diameter varying momentarily reaches the set size A1, whereby the infeed movement of the grinding wheel G is halted, during which time the workpiece W is subjected to the drifty grinding due to spring-back motion until it is ground to a size B1 which is smaller by a value D1 than the set size A1 in diameter, as shown in FIG. 4. And at step 110 (i.e., at the expiration of the predetermined waiting time), a diameter read command is input to the NC sizing and rest controller 61, which thus outputs data indicating the actual diameter of the workpiece W to the numerical controller 30. At next step 112, the data (the diameter size B1 upon completion of the drifty grinding) is read and stored as a variable X. In the next place, at step 113, the roundness of the ground workpiece W is improved by advancing the jaw 60a of the steady rest 60 to support the workpiece W, and at the same time, the wheel head 20 is advanced to perform a fine grinding operation. At step 114, the wheel head 20 is retracted to complete the fine grinding operation when a second sizing signal is input from the NC sizing and rest controller 61 to the numerical controller 30.

It is to be noted that the reference size R which the workpiece W should have upon completion of the drifty grinding has been stored in the reference size setting area 321 in advance.

At next step 116, a difference value F1 between the reference size R and the diameter size B1 is calculated and stored as a compensation value or variable Δ. And at step 118, it is ascertained whether or not the variable Δ is larger than, or equal to, a predetermined value. When the variable Δ is larger than, or equal to, the predetermined value, step 120 follows, wherein the set size A1 stored in the size setting area 320 is replaced with a new set size A2 which is obtained by subtracting a value α (half of the variable Δ) from the present set size A1.

In this manner, the processing for the first workpiece W is finished. In the grinding of a second workpiece W, the first sizing signal is issued when the actual workpiece diameter varying momentarily coincides with the set size A2 and the infeed movement of the wheel head 20 is halted for the predetermined time. Similarly, the drifty grinding is then performed, and after the fine grinding operation, another difference value F2 between the actual workpiece diameter at the end of the drifty grinding and the reference size R is calculated and stored as a new variable Δ. Further, for the subsequent grinding of a third workpiece W, the workpiece diameter size upon issuance of the first sizing signal is compensated to coincide with a further new set size A3 through steps 118 and 120.

As the number of the ground workpieces increases, the workpiece diameter upon which the drifty grinding is completed gradually approaches the predetermined reference size R, and the fine grinding amounts of the workpieces W become constant. As a result, the accuracy of finish workpieces can be improved and in addition, finish sizes of the workpieces W can be uniformed.

Figure 5:
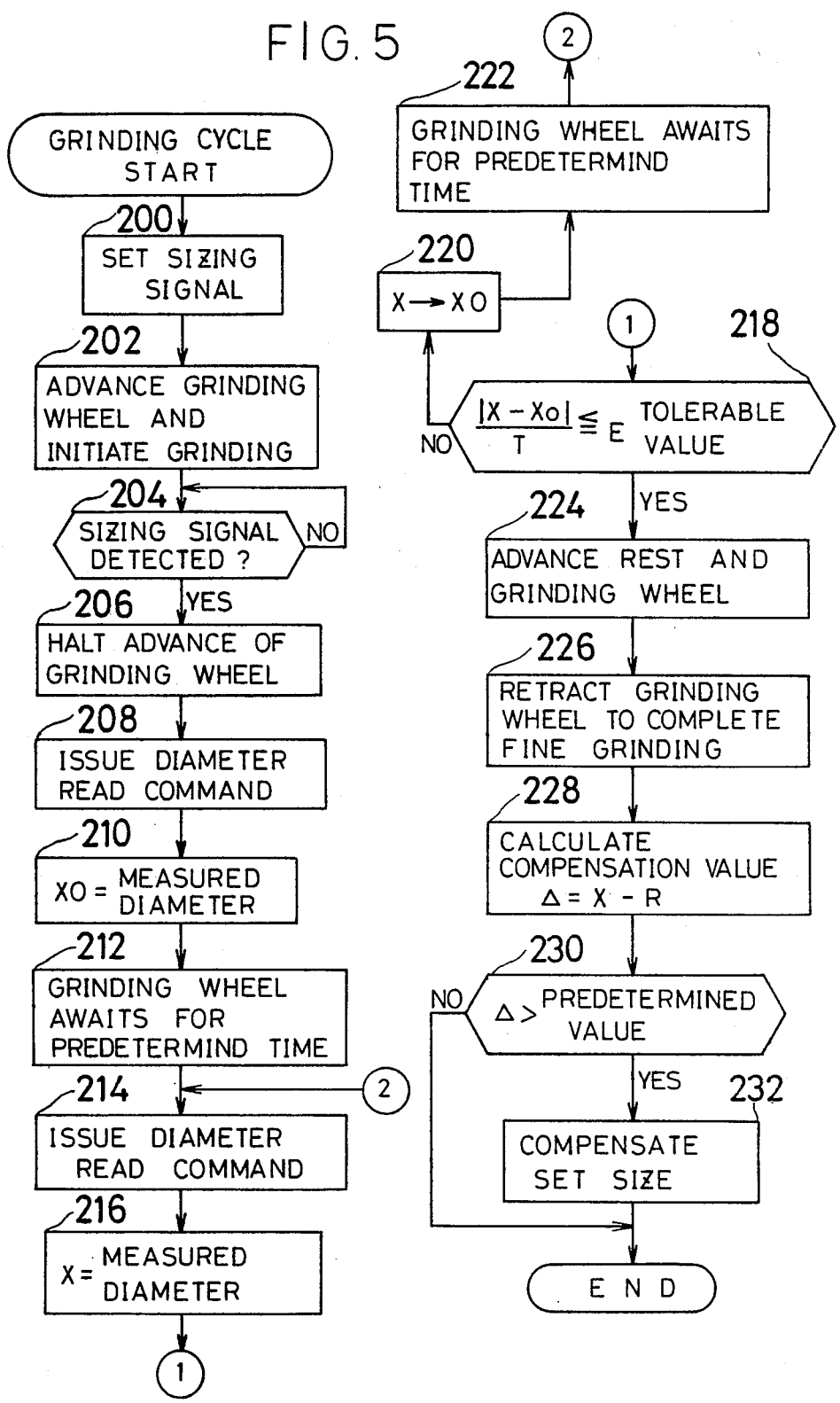
FIG. 5 is a flow chart of another subroutine executed by the central processing unit in a second embodiment of the present invention.

The second embodiment of the present invention will be described with reference to a flow chart shown in FIG. 5 which indicates the execution steps of the main CPU 31.

Although in the first embodiment, measuring the workpiece diameter is performed once upon completion of the drifty grinding, namely, when a sufficient time passes to vanish the variation of the workpiece diameter due to the spring-back motion, the measurement of the workpiece diameter in this second embodiment is repetitively performed at a predetermined time interval during the drifty grinding. That is, in the second embodiment, the fine grinding operation is initiated when the velocity at which the workpiece diameter varies for the predetermined time interval reaches a tolerable value or less. Therefore, the RAM unit 32 in the second embodiment is further provided with another setting area 323 for storing a diameter tolerable variation value E, which will be described later in more detail.

The operation of the second embodiment, performed by the apparatus as constructed above, will be described hereafter.

Steps 200-206 are equivalent to those steps 100-106 in the first embodiment, respectively. At step 208, a diameter read command is issued to the NC sizing and rest controller 61, and at next step 210, the workpiece diameter is measured and stored as a first variable XO. In the next place, step 212 is executed to await for a predetermined time T, and a step 214, the next diameter read command is issued, in response to which at next step 216, the workpiece diameter is measured again to be stored as a second variable X.

And, at step 218, the variation velocity Vv at which the workpiece diameter varies for the predetermined time interval (a limited time) is calculated using the following expression.

$$Vv = \frac{|X - XO|}{T}$$

It is then ascertained whether or not, the variation velocity Vv is equal to, or smaller than, the tolerable value E. If the variation velocity Vv is larger than the tolerable value E, namely when the drifty grinding substantially continues, step 220 is reached, wherein the second variable X is stored as the first variable XO. At next step 222, the routine remains as it is for the predetermined time period and then, returns to step 214 wherein the workpiece diameter read command is issued. Thus, the workpiece diameter changing momentarily is measured again by the NC sizing and rest controller 61, and subsequently at step 216, the newly measured value thereof is stored as the second variable X.

And at step 218, in the same manner as above, the variation velocity Vv is calculated on the basis of the difference value between X and XO and the time interval T, and thereat, a processing is further made for ascertaining whether or not the variation velocity Vv is small than, or equal to, the tolerable value E. If the variation velocity Vv is small than, or equal to the tolerable value E, step 224-232 are executed similarly to those in the first embodiment.

From the foregoing, it is apparent that the second embodiment has the advantage that the grinding cycle time becomes shorter, compared with the first embodiment which requires the predetermined sufficient time to complete the drifty grinding.

Obviously, numerous modifications and variations of the present invention are possible in light of the above teachings. It is therefore to be understood that within the scope of the appended claims, the present invention may be practiced otherwise than as specifically described herein.

What is claimed is:

1. A grinding machine wherein a sizing device is provided for outputting a sizing signal when a cylindrical workpiece is ground to a set size, and wherein in response to said sizing signal from said sizing device, the infeed movement of a wheel head rotatably carrying a grinding wheel is halted in a rough grinding operation prior to a fine grinding operation, the improvement comprising:

size setting means for storing a workpiece diameter upon which said sizing signal is to be issued;

infeed halt means for halting the infeed movement of said wheel head upon the issuance of the sizing signal;

diameter read command means for outputting a diameter read command to said sizing device in order to cause said sizing device to measure the actual diameter of said workpiece when a grinding caused by a spring-back motion of said workpiece ends after the halt of said infeed movement;

reference value storing means for storing a reference value which indicates a diameter size of said workpiece having a desired allowance on account of said subsequent fine grinding operation;

difference value calculation means for calculating a difference between said reference value and said actual workpiece diameter measured in response to said diameter read command; and sizing compensation means for compensating said workpiece diameter stored in said size setting means for said difference calculated by said difference value calculation means.

2. A grinding machine according to claim 1, wherein said diameter read command means comprises:

awaiting means for awaiting for a predetermined time longer than a time needed to end said grinding caused by said spring-back motion; and command output means for outputting said diameter read command when said predetermined time has passed.

3. A grinding machine according to claim 1, wherein said diameter read command means comprises:

command output means for outputting said diameter read command at a predetermined time interval after the halt of said infeed movement; and detecting means for detecting the variation velocity of the diameter of said workpiece at said time interval after the halt of said infeed movement so as to stop outputting of said diameter read command when said variation velocity becomes a predetermined value, whereby a diameter of said workpiece measured in response to the last one of said diameter read commands from said command output means is treated as said actual diameter of said workpiece.

* * * * *